(12) United States Patent
Hansen et al.

(10) Patent No.: US 10,246,093 B2
(45) Date of Patent: Apr. 2, 2019

(54) METHOD FOR OPERATING A MOTOR VEHICLE

(71) Applicant: FORD GLOBAL TECHNOLOGIES, LLC, Dearborn, MI (US)

(72) Inventors: Joachim Hansen, Bergisch Gladbach (DE); Harald Stoffels, Cologne (DE); Bernd Schumacher, Langenfeld (DE); Moritz Klaus Springer, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 15/382,797

(22) Filed: Dec. 19, 2016

(65) Prior Publication Data

US 2017/0174218 A1 Jun. 22, 2017

(30) Foreign Application Priority Data

Dec. 18, 2015 (DE) .................. 10 2015 226 059

(51) Int. Cl.
*B60W 10/02* (2006.01)
*B60W 10/06* (2006.01)
(Continued)

(52) U.S. Cl.
CPC ...... *B60W 30/18072* (2013.01); *B60W 10/02* (2013.01); *B60W 10/06* (2013.01); *B60W 50/0097* (2013.01); *B60W 2030/1809* (2013.01); *B60W 2420/42* (2013.01); *B60W 2420/52* (2013.01); *B60W 2422/70* (2013.01); *B60W 2510/182* (2013.01); *B60W 2520/10* (2013.01); *B60W 2520/105* (2013.01); *B60W 2530/10* (2013.01); *B60W 2530/16* (2013.01); *B60W 2550/12* (2013.01); *B60W 2550/302* (2013.01);
(Continued)

(58) Field of Classification Search
CPC ................. B60W 10/02; B60W 10/06; B60W 30/18072; B60W 30/16; B60W 50/0097
See application file for complete search history.

(56) References Cited

U.S. PATENT DOCUMENTS 7,343,238 B2   3/2008   Nou et al.
8,554,436 B2   10/2013  Kobayashi et al.
(Continued)

FOREIGN PATENT DOCUMENTS

DE       19931161 A1    1/2001
DE   102007036417 A1    2/2009
(Continued)

*Primary Examiner* — Edwin A Young
(74) *Attorney, Agent, or Firm* — David Kelley; Brooks Kushman P.C.

(57) ABSTRACT

A method for operating a motor vehicle generates a change-operating-mode signal to change operation from a normal mode with an engine engaged and running to a coasting mode with the engine disengaged and/or switched off in response to a freewheeling distance exceeding a threshold. The freewheeling distance may be based on state parameters of the motor vehicle, such as position, speed, acceleration, weight, tire pressure, braking pressure, and air resistance, for example, data related to a second vehicle obtained from forward sensors, for example, and/or ambient parameters such as air temperature, wind speed, and wind direction, for example.

20 Claims, 1 Drawing Sheet

(51) Int. Cl.
*B60W 30/18* (2012.01)
*B60W 50/00* (2006.01)

(52) U.S. Cl.
CPC . *B60W 2550/308* (2013.01); *B60W 2550/408* (2013.01); *B60W 2710/021* (2013.01); *B60W 2710/06* (2013.01); *Y02T 10/48* (2013.01); *Y02T 10/76* (2013.01)

(56) References Cited

U.S. PATENT DOCUMENTS

| | | | |
|---|---|---|---|
| 9,026,348 B2 | 5/2015 | Ichinokawa | |
| 2003/0208312 A1* | 11/2003 | Winter | G01S 13/931 |
| | | | 701/96 |
| 2013/0191005 A1* | 7/2013 | Hrovat | F02N 11/0837 |
| | | | 701/102 |
| 2014/0350809 A1* | 11/2014 | Tamaru | B60T 7/22 |
| | | | 701/67 |
| 2015/0061895 A1* | 3/2015 | Ricci | H04W 4/90 |
| | | | 340/902 |

FOREIGN PATENT DOCUMENTS

| | | |
|---|---|---|
| DE | 102012025036 A1 | 6/2014 |
| EP | 1743818 A1 | 1/2007 |

\* cited by examiner

METHOD FOR OPERATING A MOTOR VEHICLE

CROSS-REFERENCE TO RELATED APPLICATIONS

This application claims foreign priority benefits under 35 U.S.C. § 119(a)-(d) to DE 10 2015 226 059.3 filed Dec. 18, 2015, which is hereby incorporated by reference in its entirety.

TECHNICAL FIELD

The invention relates a method for operating a motor vehicle.

BACKGROUND

Drivetrains of modern motor vehicles, such as for example second-generation mild hybrid drives or drivetrains with an electrically actuated clutch (also known as an eclutch), allow the engine to be disengaged and possibly switched off during freewheeling phases of the motor vehicle to reduce motive energy loss of the motor vehicle in the form of drag power. Unlike in the case of start-stop systems, with which the engine is only switched off when the motor vehicle is at a standstill, this allows the engine to be disengaged and switched off at an earlier time, when the motor vehicle is freewheeling, for example up to a red traffic light.

SUMMARY

Stopping the engine during a freewheeling operating mode of a motor vehicle, which is also referred to as coasting, may be more effectively used where information concerning the freewheeling distance, i.e. the predicted distance that the motor vehicle can cover when coasting, is provided. Various embodiments disclosed provide ways in which a change to the coasting operating mode can take place as efficiently as possible, i.e. saving fuel and consequently also reducing emissions as much as possible.

In one or more embodiments, a method for operating a motor vehicle is provided in which state parameters of the motor vehicle are ascertained, the state parameters are evaluated in order to determine a freewheeling distance of the motor vehicle, and at least the determined freewheeling distance is evaluated to generate a change-operating-mode signal.

Ascertaining the state parameters of the motor vehicle allows direct or indirect determination of the kinetic energy, or the momentum thereof, that defines the maximum freewheeling distance which the vehicle can cover after disengaging and possibly switching off the engine, while taking the energy losses into account. In other words, ascertaining the state parameters of the motor vehicle allows the possible freewheeling distance of the vehicle after disengaging and possibly switching off the engine to be predicted. In dependence on this freewheeling distance, a change-operating-mode signal is then generated, in order to change from a normal operating mode, with the engine running, to a coasting operating mode, in which the engine is disengaged and/or not running. The change-operating-mode signal can be brought to the attention of the driver of the motor vehicle, for example by optical and/or acoustic means, or the change-operating-mode signal automatically brings about such a change. The determined or predicted freewheeling distance can be compared with a threshold value and, in response for example to an overshooting of this threshold value, the motor vehicle can then be operated in the coasting mode. In this case, the threshold value may be a fixed value, or it is determined according to the driving situation, for example depending on the vehicle speed. Consequently, operation in the coasting mode only takes place if fuel is actually saved by disengaging and switching off the engine. Therefore, operation in the coasting mode takes place particularly efficiently, i.e. in such a way as to save fuel and consequently reduce emissions.

According to one embodiment, the state parameters comprise the position and/or the speed and/or the acceleration and/or the vehicle weight and/or the tire pressure and/or the braking pressure and/or the air resistance of the motor vehicle. The state parameters can be ascertained with corresponding sensors, such as tachometers, acceleration sensors, and other sensors. Accelerations can be measured particularly easily with inexpensive acceleration sensors, the values of which are then for example numerically integrated once or twice in order to determine speed and/or position values, or variables representative thereof. The state parameters can be used not only for determining the state of the driving dynamics at the particular time, but also for making a prediction as to how the state of the driving dynamics will be changing at the particular time, for example because the first motor vehicle is being accelerated or braked by the driver. Consequently, an improved database is provided for the decision to change to the coasting mode.

According to a further embodiment, ambient parameters are ascertained and evaluated for determining the freewheeling distance. Thus, the database for the decision to change to the coasting mode is further expanded.

According to a further embodiment, the ambient parameters comprise the air temperature and/or the wind speed and direction and/or a gradient of the road. The ambient data, such as for example the air temperature, may be measured with an outside temperature sensor of the motor vehicle or, such as the wind speed and direction, be transmitted to the motor vehicle wirelessly from data sources or, such as the gradient of the road, be measured with an inclinometer of the motor vehicle or be read out from a navigation system of the motor vehicle.

According to a further embodiment, a safety distance is taken into account in the determination of the freewheeling distance. This minimizes driving up too close to a second motor vehicle, and consequently the risk of a rear-end collision.

According to a further embodiment, data of a second vehicle, driving ahead of the first motor vehicle in the driving direction, are ascertained. The ascertained data of the second motor vehicle, driving ahead, define a maximum possible freewheeling length, that is to say the distance which, depending on the traffic situation, the first motor vehicle can cover by coasting. This allows a change to the coasting mode to be made even more efficiently.

According to one embodiment, the ascertained data comprise the distance from the second motor vehicle and/or the position of the second motor vehicle and/or the speed of the second motor vehicle and/or the acceleration of the second motor vehicle. These data can be used not only for establishing the distance at the particular time from the second motor vehicle, but also for making a prediction as to how the value of the distance will be changing during a freewheeling phase, for example because the second motor vehicle is being accelerated or braked. In this way an improved database is provided for the decision to change to the coasting mode.

According to a further embodiment, the ascertained data are ascertained with a front sensor system of the first vehicle. Consequently, the ascertained data are available irrespective of communication connections. Alternatively, such data may in addition or as an alternative also be transmitted to the motor vehicle wirelessly from for example a traffic monitoring system or by way of C2C communication.

According to a further embodiment, the front sensor system has distance warning radar and/or a front camera. These components may for example be assigned to driver assistance systems, such as for example a crossing-traffic assistant, of the first motor vehicle. It is thereby also possible to fall back on already existing components of the first motor vehicle.

Embodiments also include a motor vehicle comprising an evaluation device for determining the freewheeling distance and for evaluating at least the freewheeling distance and for generating a change-operating-mode signal and also such an evaluation device.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
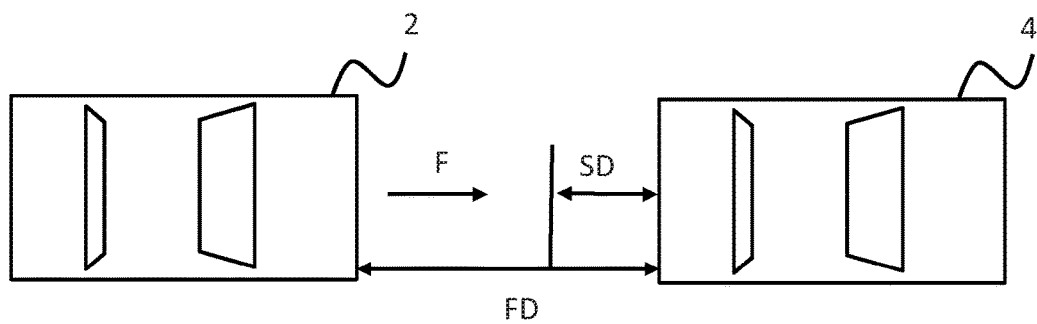
FIG. 1 shows a traffic situation.

Referring to FIG. 1, a traffic situation in which a first motor vehicle 2 is following a second motor vehicle 4 in the driving direction F is illustrated. At the particular time, the second motor vehicle 4 is reducing its speed, for example because it is approaching a red traffic light or traffic congestion.

In the illustrated representative embodiment, the first motor vehicle 2 has a mild hybrid drive or a drivetrain comprising an eclutch, which each allow the engine to be disengaged and possibly switched off during freewheeling phases of the first motor vehicle 2 to reduce motive energy loss of the first motor vehicle 2 in the form of drag power. A mild hybrid drive is understood here as meaning a drivetrain in which an electric drive assists the engine to increase the power. Furthermore, braking energy can be partially recovered in a regenerative braking system.

Consequently, the first motor vehicle 2 is designed to change between a normal operating mode and a coasting mode, in order in this way to save fuel during a freewheeling phase in the coasting mode by disengaging and additionally switching off the engine. In order to carry out a change between these two operating modes only whenever it is actually meaningful, i.e. leads to a saving of fuel, a determination of the freewheeling distance FD, possibly reduced by a safety distance SD, is performed, that is to say the distance that the first motor vehicle 2 can coast in the coasting mode.

Figure 2:
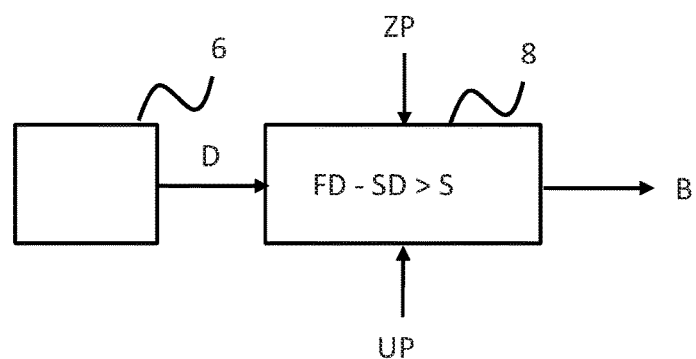
FIG. 2 shows in a schematic representation an exemplary embodiment of a motor vehicle that is designed for carrying out a method according to one or more embodiments of the disclosure.

Provided for this purpose is the evaluation device 8 which is schematically represented in FIG. 2 and generates a change-operating-mode signal B in order to change from a normal operating mode with the engine running, to the coasting operating mode in which the engine may be disengaged and not running. As in the present embodiment, the change-operating-mode signal B can be brought to the attention of the driver of the first motor vehicle 2, for example by optical and/or acoustic means, or the change-operating-mode signal B automatically brings about such a change.

In the present embodiment, the evaluation device 8 is connected to a front sensor system 6 of the first motor vehicle 2 in order to transmit data D from the front sensor system 6 to the evaluation device 8.

The front sensor system 6 is designed to ascertain data D of the second vehicle 4, driving ahead of the first motor vehicle 2 in the driving direction F. In the present embodiment, the ascertained data D are the distance from the second motor vehicle 4 and the position and the speed and the acceleration of the second motor vehicle 4. In the present embodiment, the front sensor system 6 of the first vehicle 2 comprises distance warning radar and/or a front camera.

Furthermore, in one embodiment, the evaluation device 8 is designed to read in values for state parameters ZP that have been ascertained with sensors of the first motor vehicle 2 and/or been stored. In the present embodiment, the state parameters ZP comprise the position and the speed and the acceleration of the first motor vehicle 2. In the present embodiment, the state parameters ZP also comprise the vehicle weight and the tire pressure and also the braking pressure and the air resistance of the first motor vehicle 2.

Furthermore, in the present embodiment, the evaluation device 8 is designed to read in and evaluate ambient parameters UP. The ambient parameters UP comprise the temperature and the wind speed and direction and a gradient of the road. The air temperature is measured with an outside temperature sensor of the first motor vehicle 2, while the wind speed and direction are transmitted wirelessly to the first motor vehicle 2 from a data source, such as for example a weather station. On the other hand, the gradient of the road in the driving direction F is measured with an inclinometer of the first motor vehicle 2 or read out from a navigation system of the first motor vehicle 2.

Finally, in the present embodiment, the evaluation device 8 is designed to take the safety distance SD into account in the determination of the freewheeling distance FD, in order in this way to minimize the risk of a rear-end collision.

For performing these stated tasks, in the present embodiment the evaluation device 8 comprises hardware and and/or software components.

During operation, the evaluation device 8 reads in the ascertained data D, the ambient parameters UP and the state parameters ZP, and evaluates them in order to determine the freewheeling distance FD, reduced by the safety distance SD.

In one embodiment, the acceleration A of the first motor vehicle 2 in the driving direction F is ascertained with an acceleration sensor and evaluated together with values for the mass or inertia M, the air resistance $W_L$ and the rolling resistance $W_R$ of the first motor vehicle 2 in order to determine the freewheeling distance FD, reduced by the safety distance SD. In this case, these values may be continuously ascertained and updated, or they are continuously determined by computer-aided models.

For the determination of the freewheeling distance FD, reduced by the safety distance SD, for example a double numerical integration may be carried out, in which account is taken not only of the acceleration A but also of the mass or inertia M, the air resistance $W_L$ and the rolling resistance $W_R$ of the first motor vehicle 2:

$$FD-SD=\iint 1/M(A-W_L-W_R)dt^2$$

The determined freewheeling distance FD is compared with a predetermined threshold value S. If the determined freewheeling distance FD overshoots the threshold value S, the change-operating-mode signal is generated. It can in this way be ensured that disengaging and switching off the engine is only carried out if fuel is actually saved.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a vehicle having an engine, comprising:
   receiving, by a controller, a first signal corresponding to at least one of vehicle speed and vehicle acceleration;
   receiving, by the controller, a second signal corresponding to at least one of tire pressure and braking pressure;
   receiving, by the controller, ambient data corresponding to at least one of air temperature, wind speed, and wind direction;
   receiving, by the controller, a third signal corresponding to a distance to a forward vehicle; and
   disengaging the engine from a vehicle powertrain in response to a freewheeling distance exceeding a corresponding threshold, the freewheeling distance calculated by the controller based on the first, second, and third signals and the ambient data.

2. The method of claim 1 further comprising stopping the engine in response to the freewheeling distance exceeding the corresponding threshold.

3. The method of claim 1 wherein disengaging the engine from the vehicle powertrain comprises operating an electronically controllable clutch.

4. The method of claim 1 further comprising calculating the freewheeling distance using a weight of the vehicle.

5. The method of claim 1 wherein the freewheeling distance corresponds to the distance to the forward vehicle less a predetermined safety distance.

6. The method of claim 1 further comprising receiving data corresponding to a vehicle speed or vehicle acceleration of the forward vehicle; and
   calculating the freewheeling distance using the vehicle speed or vehicle acceleration of the forward vehicle.

7. The method of claim 6 wherein the vehicle comprises a front sensor system that provides the vehicle speed or vehicle acceleration of the forward vehicle.

8. The method of claim 7 wherein the front sensor system comprises distance warning radar or a front camera.

9. A vehicle comprising:
   an engine selectively coupled to a powertrain; and
   a controller configured to disengage the engine from the powertrain or stop the engine in response to a freewheeling distance exceeding a threshold, the freewheeling distance calculated by the controller using signals indicative of at least two of vehicle speed, vehicle acceleration, vehicle braking pressure, and distance to a forward vehicle.

10. The vehicle of claim 9 further comprising a front sensor system configured to provide data indicating the distance to the forward vehicle.

11. The vehicle of claim 10 wherein the front sensor system comprises collision warning radar.

12. The vehicle of claim 10 wherein the front sensor system comprises a camera.

13. The vehicle of claim 9 wherein the controller is further configured to calculate the freewheeling distance using weight of the vehicle.

14. The vehicle of claim 9 further comprising a tire pressure monitoring system, wherein the controller is further configured to calculate the freewheeling distance using tire pressure of at least one vehicle tire as provided by the tire pressure monitoring system.

15. The vehicle of claim 9 wherein the controller is further configured to calculate the freewheeling distance using the distance to the forward vehicle less a safety distance.

16. The vehicle of claim 9 further comprising an electrically controllable clutch selectively coupling the engine to the powertrain, wherein the controller is further configured to operate the electrically controllable clutch to disengage the engine in response to the freewheeling distance exceeding the threshold.

17. A method for controlling a vehicle having an engine selectively coupled to a driveline by an electrically controllable clutch, comprising:
   stopping the engine in response to a freewheeling distance calculated by a vehicle controller exceeding an associated threshold, the freewheeling distance calculated in response to vehicle signals or data corresponding to at least three of vehicle speed, vehicle acceleration, braking pressure, distance to a forward vehicle, tire pressure, and vehicle weight.

18. The method of claim 17 further comprising operating the electrically controllable clutch in response to the freewheeling distance exceeding the associated threshold to disengage the engine from the driveline.

19. The method of claim 17 further comprising calculating the freewheeling distance using ambient parameters including at least one of air temperature, wind speed, and wind direction.

20. The method of claim 17 further comprising generating a signal to alert a vehicle driver in response to the freewheeling distance exceeding the associated threshold.

* * * * *